United States Patent [19]

McLeod

[11] E Patent Number: Re. 32,734

[45] Reissued Date of Patent: Aug. 23, 1988

[54] REVERSIBLE MATTRESS

[76] Inventor: Arlis D. McLeod, P.O. Box 249, Leakesville, Miss. 39451

[21] Appl. No.: 920,227

[22] Filed: Oct. 16, 1986

Related U.S. Patent Documents

Reissue of:

[64] Patent No.: 4,476,594
Issued: Oct. 16, 1984
Appl. No.: 447,216
Filed: Dec. 6, 1982

[51] Int. Cl.[4] ..... A47C 27/15; A47C 27/16

[52] U.S. Cl. ..... 5/464; 5/465

[58] Field of Search ..... 5/462, 464, 465, 481, 5/420, 460, 417

[56] References Cited

U.S. PATENT DOCUMENTS

| | | | |
|---|---|---|---|
| 2,469,084 | 5/1949 | Schenker | 5/465 |
| 2,551,976 | 5/1951 | Smith | 5/417 |
| 2,633,905 | 4/1953 | Geldbaugh | 5/465 |
| 2,638,608 | 5/1953 | Garrigus | 5/465 |
| 2,721,339 | 10/1955 | Johnson | 5/465 |
| 2,853,399 | 9/1958 | Shoults | 5/417 |
| 2,860,937 | 11/1958 | Einstein et al. | 5/465 |
| 3,049,729 | 8/1962 | Broyles | 5/411 |
| 3,051,601 | 8/1962 | Schick | 5/464 |
| 3,319,274 | 5/1967 | Upton | 5/465 |
| 3,512,191 | 5/1970 | Wall et al. | 5/460 |
| 3,534,417 | 10/1970 | Boyles | 5/464 |
| 3,538,521 | 11/1970 | Basner | 5/462 |
| 3,670,346 | 6/1972 | Nissen | 5/465 |
| 3,846,857 | 11/1974 | Weinstock | 5/464 |
| 3,848,278 | 11/1974 | Propst | 5/465 |
| 3,885,258 | 5/1975 | Regan | 5/464 |
| 4,336,621 | 6/1982 | Schwartz | 5/411 |
| 4,370,767 | 2/1983 | Fraser | 5/417 |

FOREIGN PATENT DOCUMENTS

| | | | |
|---|---|---|---|
| 2446092 | 9/1980 | France | 5/464 |

*Primary Examiner*—Gary L. Smith
*Assistant Examiner*—Vinh Luong
*Attorney, Agent, or Firm*—Watson, Cole, Grindle & Watson

[57] ABSTRACT

A cushion or mattress assembly having first and second resilient support surfaces of varying firmness each secured to a center piece stiffener board. The stiffener board is formed from a plurality of hinged sections allowing flexure of the stiffener board in one direction only, as well as allowing the entire assembly to be folded or rolled up for storage.

13 Claims, 2 Drawing Sheets

REVERSIBLE MATTRESS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to a resilient cushion assembly for the support of the body and, more particularly, to a mattress cushion assembly which provides first and second support surfaces having varying degrees of firmness and further including a hinged stiffener member disposed between the first and second support members to allow for folding or rolling-up of the cushion assembly.

2. Description of the Prior Art

The conventional mattress typically provides a single degree of support to the body due to the substantially homogeneous nature of the cushioning material disposed therein. Such a single degree of support, while adequate for most purposes, may prove inadequate depending upon the support preferences of the user. A need has thus arisen to provide variable cushion support within a single cushion or mattress. An attempt to realize such objectives has been tried using a plurality of selectable surfaces having varying hardnesses.

A mattress directed generally to the provision of a plurality of selectable surfaces of varying hardnesses is shown by Johnson in U.S. Pat. No. 2,721,339, which discloses a mattress having two superposed halves joined together in a manner enabling one half to be swung over and upon the other half. A first half of the mattress is provided with a plurality of hardboard panels, while the second half consists of a uniform construction of cotton batting. The second half does not have any panels disposed therein. The panels are placed in the first mattress half relatively close to the sleeping surface. Such assembly allows for bidirectional flexing of the panels both toward and away from the sleeping surface. However, should the two mattress halves be encased within a mattress cover, removal of the cover would be required in order for the full range of hardnesses to be available to the user.

Thus, there exists a need for a simple mattress or cushion assembly which provides for uni-directional flexing of support panels disposed therein as well as for a mattress or cushion assembly which obviates the removal of a mattress cover in order to allow for a full choice of mattress hardnesses.

SUMMARY OF THE INVENTION

Accordingly, this invention has been made to meet the needs discussed above and, therefore, has an object to provide a cushion support assembly which offers a user a choice of support stiffnesses and which facilitates the conversion of the assembly from a first mode of stiffness to a second mode of stiffness.

A further object is to provide a compact support unit having a standard thickness so as to eliminate the necessity of a box spring unit.

A still further object of the invention is to facilitate the application and retention of covers or sheets about the mattress assembly.

Another object is to provide a mattress allowing substantially uni-directional flexing such that flexing is permitted in only a single operative mode of the assembly.

Another object is to provide a mattress assembly having a support baseboard so as to eliminate the necessity of a box spring unit.

Yet another object is to provide a mattress capable of being folded or rolled into a compact unit for storage.

Another object is to provide a cushion in accordance with the invention and adaptable for use with furniture such as couches, chairs, or with pillows or seat cushions.

The foregoing and other objects are achieved according to the present invention by the provision of an assembly for the support of the body, which includes a base support board overlying a bed frame for providing a substrate or support base for the mattress. Firm and soft mattress sections are joined to a center piece stiffening board composed of a plurality of transverse abutting hinged sections. The stiffener board is dimensioned so as to provide a peripheral recess at the junction of the top and bottom mattress sections. Such hinged pivotable sections allow for the rolling up of the mattress assembly to form a compact unit thereby facilitating storage.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENT

The assembly developed in accordance with the present invention will now be described in conjunction with the accompanying FIG. 1, FIG. 2, and FIG. 3, within which, for example, a mattress assembly 1 is disclosed. A firm mattress section 2 is formed of a resilient material, such as foam rubber, having a predetermined stiffness. A soft mattress section 3, also formed of a resilient material, is also provided. The stiffness of the soft bottom mattress section 3 is chosen so as to have a stiffness different from that of the firm top mattress section 2. As shown in FIG. 3, the top mattress section 2 is composed of a firm material, while the bottom mattress section 3 is composed of a soft material, thereby affording the user a choice of mattress stiffnesses, offering varying degrees of support. The firm material may have a density greater than that of the soft material.

Figure 1:
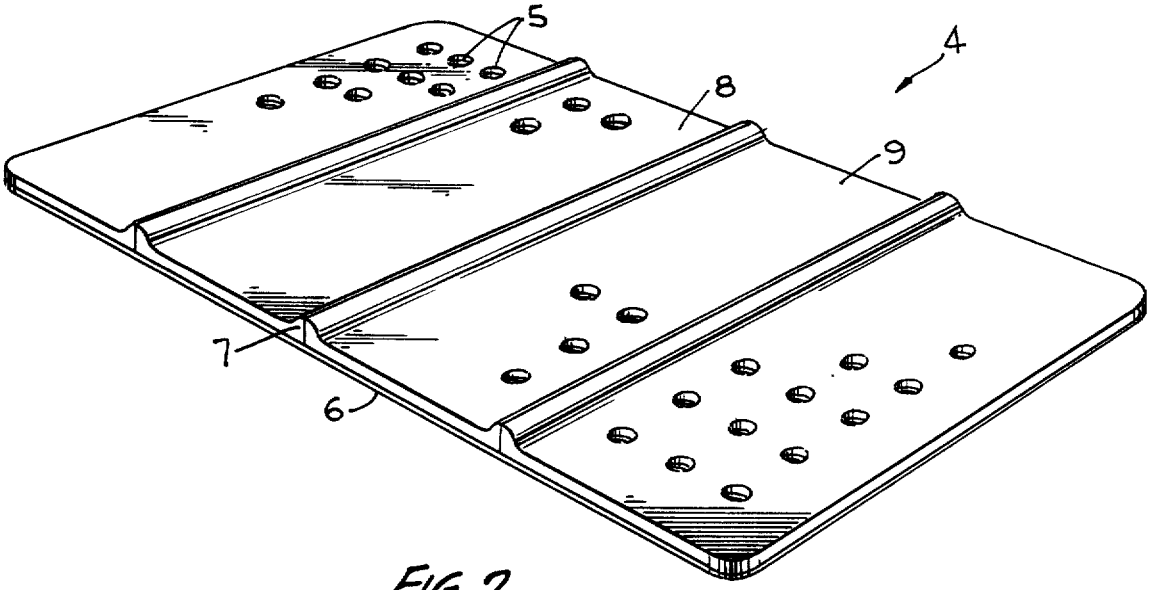
FIG. 1 is an isometric view of the center piece stiffener board.
Figure 2:
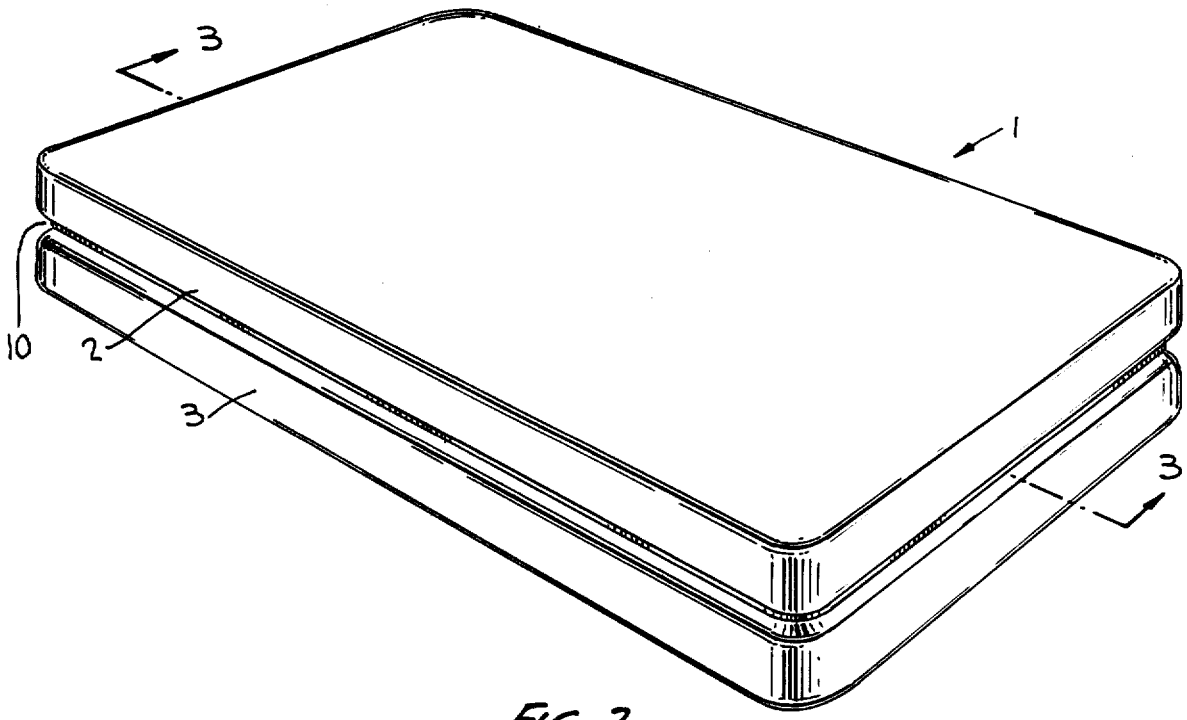
FIG. 2 is an isometric view of the mattress assembly.
Figure 3:
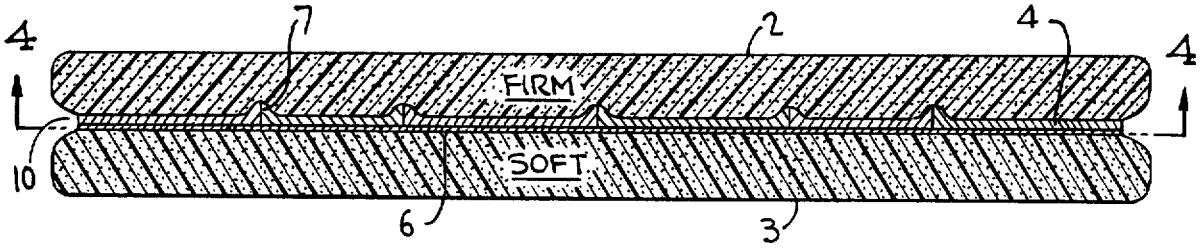
FIG. 3 is a sectional side elevation view of a preferred embodiment of the mattress assembly presenting the firm support surface in an operative mode.

The center piece or stiffener board 4 as individually depicted in FIG. 1 is shown disposed between the firm mattress section 2 and the soft mattress section 3 in FIGS. 2 and 3. As further depicted in FIG. 1, the rigid stiffener board 4 may be formed from plastic and may include a plurality of cutouts or perforations 5 formed therein so as to reduce the weight thereof. The center piece stiffener board 4 is permanently bonded or laminated to a hinge material 6 on a single side of the stiffener board 4. The stiffener board 4 is formed from a plurality of abutting transverse sections 8, 9 flexibly joined via hinge material 6. A transverse strengthening ridge 7 is provided along each abutting transverse section on the side opposing the hinge material 6. Such construction ensures unidirectional flexing and increases the structural integrity and stability of the stiffener board 4.

Figure 5:
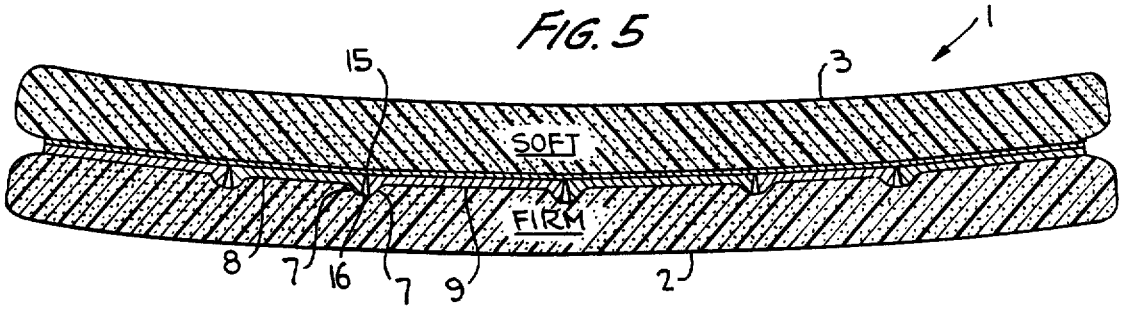
FIG. 5 is a sectional side elevation of a preferred embodiment of the mattress assembly showing the soft side disposed in an operative mode in a loaded condition.

As further depicted in FIGS. 3 and 5, the stiffener board 4 is disposed between and secured to or laminated to the firm mattress section 2 and the soft mattress section 3 so that the hinge material 6 contacts the soft or bottom mattress section 3 while the transverse strengthening ridges protrude into the top or firm mattress section 2. Such an assembly enhances the effect of the user's choice of a firm or soft mattress surface by allowing flexure towards the soft mattress section 3 when the soft mattress section is on top of the mattress assembly 1 adjacent the user, while preventing such flexure towards the firm mattress section 2 when the firm mattress section is on top of the mattress assembly adjacent the user.

Referring to FIGS. 2 and 3, the centerpiece or stiffener board 4 is dimensioned so as to provide a recess 10 of substantially uniform depth along the entire periphery of the junction of the firm and soft mattress sections 2,3 with the stiffener board 4. The recess may typically have a depth of 2 inches so as to facilitate the fitting of a cover or sheet on both the firm and soft mattress sections 2, 3. Moreover, the mattress assembly 1 may be dimensioned in standard sizes adaptable for use with standard size bedding sheets. Furthermore, the thicknesses of the firm and soft mattress sections 2, 3 as well as the thickness stiffener board 4 are dimensioned so as to form a mattress assembly having an overall thickness approximating the thickness of a standard mattress and box spring assembly, for example, 16 inches.

Figure 4:
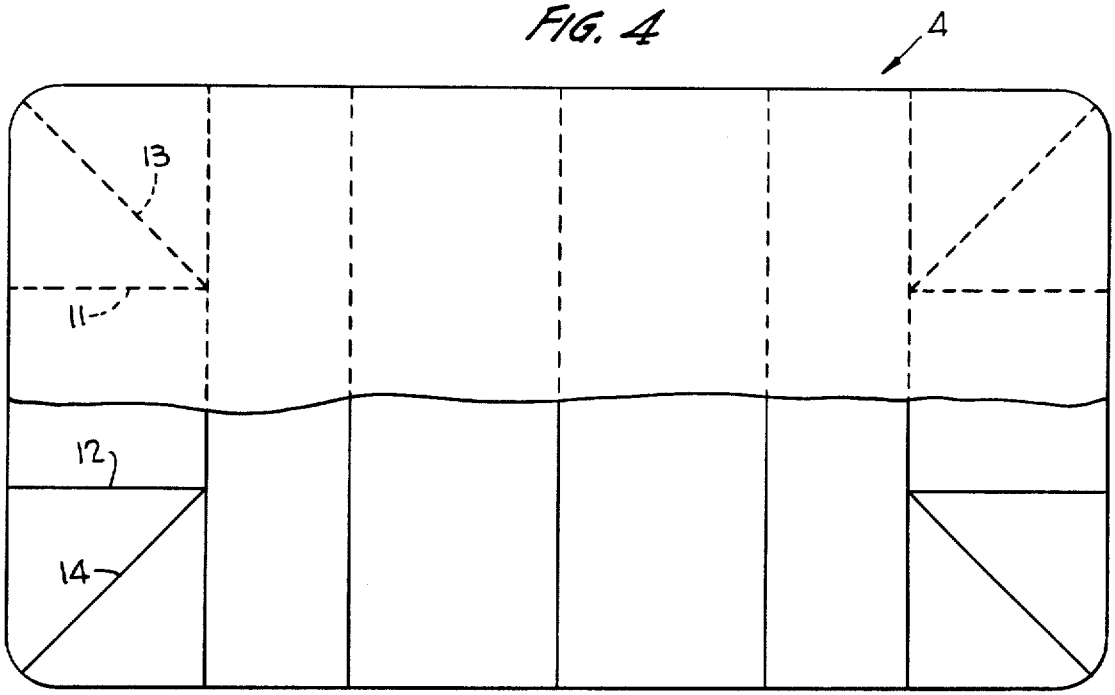
FIG. 4 is a partial sectional view of FIG. 3 taken along lines 4—4.

As depicted in FIG. 4, a plurality of longitudinal separations or joints 11, 12 may be formed in the stiffener board 4 along with a plurality of diagonal separations or joints 13, 14, at each corner portion of the stiffener board so as to increase the flexure of the soft mattress section 3 when placed in an upper or operative mode.

FIG. 5 shows the effect of the stiffener board 4 when the soft section 3 is placed in an upper or operative mode in a loaded condition. Flexure of the abutting transverse sections 8 and 9 about hinge point 15 when under load effects a separation 16 of the transverse strengthening ridges 7 so as to cause the mattress assembly 1 to take a generally arcuate shape as shown. Such arcuate shape is to be contrasted with that shown in FIG. 3 wherein the firm mattress section 2 is disposed on top in an operative mode so as to form a substantially planar support surface wherein the separation 16 shown in FIG. 5 is closed.

Figure 6:
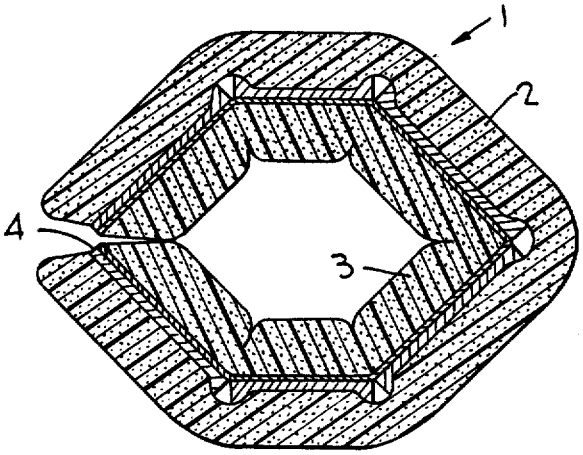
FIG. 6 is a sectional side elevation view of the mattress assembly in a rolled-up or storage condition.

In FIG. 6 is shown the mattress assembly 1 in a rolled up or storage condition wherein the soft mattress section 3 is disposed inwardly of the firm mattress section 2 so as to form a roll having a substantially polygonal cross section. Such a shape facilitates transportation and storage.

Figure 7:
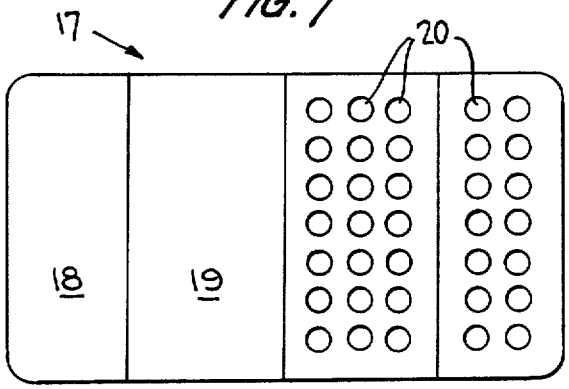
FIG. 7 is a plan view of a support baseboard for the mattress assembly.
Figure 8:
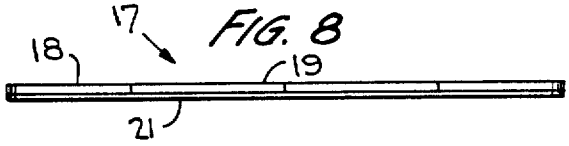
FIG. 8 is an elevation view of the support baseboard.

A rigid baseboard 17 shown in FIG. 7 may be provided having a plurality of hinged sections 18, 19 so as to enable folding thereof or baseboard 17 may alternatively be formed in one piece. Baseboard 17 is dimensioned so as to overlie a bedframe and provide a support for the mattress assembly 1. The baseboard 17 may also include a plurality of cutouts or perforations 20 to reduce the weight thereof. FIG. 8 shows the hinged sections 18, 19 of baseboard 17 connected by hinge material 21.

While the principle of the present invention has been directed to a mattress assembly per se, the design will also apply to any cushion, couch, pillow, or cushioning support surface applicable for use with various types of furniture such as chairs, couches, or auto or boat seat cushions, pillows or outdoor furniture or camping equipment such as sleeping bags.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cushion assembly which can be reversed in orientation to expose support cushions having different stiffnesses, said cushion assembly comprising a stiffener member which includes (1) a plurality of section elements which are positioned in generally abutting side by side relationship to one another, each section element defining a first face, an oppositely directed second face, and side edges, each section member also including an abutment ridge which extends away from its second face adjacent each side edge thereof which is abuttable with the side edge of an adjacent section element, and (2) a hinge means connected between the first faces of adjacent section elements so as to flexibly connect said plurality of section elements together; said abutment ridges on said section elements being abuttable to prevent the movement of adjacent section elements such that their second faces pivot towards one another, and said hinge means connected between said section elements allowing adjacent section elements to move such that their first faces pivot toward one another, a first support cushion connected to said hinge means, said first support cushion having a unitary structure and a predetermined stiffness, and a second support cushion connected to the second faces of said plurality of section elements, said second support cushion having a unitary structure and a predetermined stiffness, the predetermined stiffness of said second support cushion being greater than the predetermined stiffness of said first support cushion.

2. The cushion assembly as defined in claim [1] *13* wherein said hinge means comprises a single piece of material which is connected to the first faces of said plurality of section elements.

3. The cushion assembly as defined in claim 2 wherein said material comprises cloth.

4. The cushion assembly as defined in claim 3 wherein said cloth includes fiberglass.

5. The cushion assembly as defined in claim [1] *13* wherein each of said plurality of section elements includes a plurality of perforations.

6. The cushion assembly as defined in claim [1] *13* wherein said first and second support cushions are generally rectangular in shape and have equivalent longitudinal and transverse dimensions, and wherein said stiffener member is generally rectangular in shape but has smaller longitudinal and transverse dimensions than said first and second support cushions so as to provide a recess between said first and second support cushions of uniform dimensions and in which the edges of covering sheets for the support cushions can be retained.

7. The cushion assembly as defined in claim 6 wherein at least one of said section elements is composed of at least two portions, and wherein each portion of each section elements is connected to adjacent portions by said hinge means.

8. The cushion assembly as defined in claim 7 wherein at least one of the section elements which are respectively located at the opposite ends of said plurality of section elements comprises at least three portions which are shaped so as to provide two separations that respectively extend diagonally inwardly from the corners thereof.

9. The cushion assembly as defined in claim [1] *13* each of said first and second support cushions is made of foam rubber, the foam rubber of said second support cushion being denser than the foam rubber of said first support cushion.

10. The cushion assembly as defined in claim [1] *13* which further includes a separate rigid baseboard.

11. The cushion assembly as defined in claim 10 wherein said rigid baseboard includes perforations.

12. The cushion assembly as defined in claim 11 which consists of said stiffener member, said first and second support cushions and said rigid baseboard.

*13. A cushion assembly which can be reversed in orientation to expose support cushions having different stiffnesses, said cushion assembly comprising*

*a stiffener member which includes (1) a plurality of generally flat section elements which are positioned in generally abutting side-by-side relationship to one another, each section element defining a first face, an oppositely directed second face, and side edges, at least one of said side edges of said section element being adjacent a side edge of an adjacent section element, each section element also including an abutment ridge at each of said side edges thereof that are adjacent to a side edge of an adjacent section element, and (2) a hinge means connecting adjacent section elements such that, when the connected adjacent section elements are aligned in common plane, they can be pivoted towards one another in one direction but not in the opposite direction,*

*a first support cushion having a unitary structure and a predetermined thickness, said first support cushion being connected to said section elements over the faces thereof which will move together when said connected adjacent section elements are aligned in a common plane and then pivoted towards one another, and*

*a second support cushion having a unitary structure and a predetermined thickness connected to said section elements over the opposite faces thereof to which the first support cushion is connected, the predetermined stiffness of said second support cushion being greater than the predetermined stiffness of said first support cushion.*

* * * * *